(12) United States Patent
Gove et al.

(10) Patent No.: US 8,572,441 B2
(45) Date of Patent: Oct. 29, 2013

(54) MAXIMIZING ENCODINGS OF VERSION CONTROL BITS FOR MEMORY CORRUPTION DETECTION

(75) Inventors: Darryl J. Gove, Sunnyvale, CA (US); Zoran Radovic, San Jose, CA (US); Jonathan Adams, San Francisco, CA (US)

(73) Assignee: Oracle International Corporation, Redwood City, CA (US)

( * ) Notice: Subject to any disclaimer, the term of this patent is extended or adjusted under 35 U.S.C. 154(b) by 262 days.

(21) Appl. No.: 13/198,904

(22) Filed: Aug. 5, 2011

(65) Prior Publication Data
US 2013/0036332 A1 Feb. 7, 2013

(51) Int. Cl.
*G06F 11/00* (2006.01)
*G06F 11/10* (2006.01)

(52) U.S. Cl.
USPC ............... 714/53; 714/49; 714/54; 714/805

(58) Field of Classification Search
USPC ................ 714/49, 53, 54, 805, 811
See application file for complete search history.

(56) References Cited

U.S. PATENT DOCUMENTS

| | | | | |
|---|---|---|---|---|
| 4,761,785 | A * | 8/1988 | Clark et al. | 714/805 |
| 5,014,273 | A | 5/1991 | Gagliardo et al. | |
| 5,305,326 | A * | 4/1994 | Solomon et al. | 714/6.12 |
| 5,627,965 | A | 5/1997 | Liddell et al. | |
| 5,754,567 | A * | 5/1998 | Norman | 714/773 |
| 5,856,987 | A | 1/1999 | Holman | |
| 5,889,940 | A | 3/1999 | Liddell et al. | |
| 6,038,684 | A | 3/2000 | Liddell et al. | |
| 6,047,392 | A | 4/2000 | Liddell et al. | |
| 6,049,893 | A | 4/2000 | Liddell et al. | |
| 6,092,218 | A | 7/2000 | Liddell et al. | |
| 6,134,672 | A | 10/2000 | Liddell et al. | |
| 6,134,679 | A | 10/2000 | Liddell et al. | |
| 6,141,766 | A | 10/2000 | Liddell et al. | |
| 6,170,068 | B1 | 1/2001 | Liddell et al. | |
| 6,173,416 | B1 | 1/2001 | Liddell et al. | |
| 6,519,704 | B1 | 2/2003 | Liddell et al. | |
| 6,539,513 | B1 | 3/2003 | Chen | |
| 6,574,768 | B2 | 6/2003 | Cypher | |
| 6,804,799 | B2 * | 10/2004 | Zuraski, Jr. | 714/54 |
| 6,912,686 | B1 * | 6/2005 | Rodriguez et al. | 714/799 |

(Continued)

OTHER PUBLICATIONS

U.S. Appl. No. 13/196,514, filed Aug. 2 2011, Zoran Radovic, et al.

*Primary Examiner* — Joseph Schell
(74) *Attorney, Agent, or Firm* — Rory D. Rankin; Meyertons, Hood, Kivlin, Kowert & Goetzel, P.C.

(57) ABSTRACT

Systems and methods for maximizing a number of available states for a version number used for memory corruption detection. A physical memory may be a DRAM comprising a plurality of regions. Version numbers associated with data structures allocated in the physical memory may be generated so that version numbers of adjacent data structures in a virtual address space are different. A reserved set and an available set of version numbers are associated with each one of the plurality of regions. A version number in a reserved set of a given region may be in an available set of another region. The processor detects no memory corruption error in response to at least determining a version number stored in a memory location in a first region identified by a memory access operation is also in a reserved set associated with the first region.

20 Claims, 14 Drawing Sheets

(56) References Cited

U.S. PATENT DOCUMENTS

| | | | |
|---|---|---|---|
| 7,036,066 B2 * | 4/2006 | Weibel et al. | 714/752 |
| 7,788,506 B2 * | 8/2010 | Bancel et al. | 713/193 |
| 7,992,061 B2 * | 8/2011 | Zeng | 714/723 |
| 2004/0255225 A1 | 12/2004 | Takai | |

\* cited by examiner

Truth Table 400

| VERSION TABLE<br>Available Set = {0x1 ... 0xE}<br>Reserved Set = {0x0, 0xF} | | B<br>(Version Number Stored in Memory) | |
|---|---|---|---|
| | | B in {0x1 ... 0xE} | B in {0x0, 0xF} |
| A<br>(Version Number Received from Processor) | A in {0x1 ... 0xE}<br>and<br>A = B | 0 | 0 |
| | A in {0x1 ... 0xE}<br>and<br>A ≠ B | 1 | 0 |
| | A in {0x0, 0xF} | 1 | 0 |

FIG. 4

Truth Table 1000

| VERSION TABLE | | B<br>Memory Stored Version Number | | |
|---|---|---|---|---|
| | | Reserved Subset1 = {0x0} | B in {0x1 ... 0xE} | Reserved Subset2 = {0xF} |
| A<br>Memory Access Address Version Number from Processor | Reserved Subset1 = {0x0} | 0 | 1 | 1 |
| | A in {0x1 ... 0xE} and A = B | 0 | 0 | 1 |
| | A in {0x1 ... 0xE} and A ≠ B | 0 | 1 | 1 |
| | Reserved Subset2 = {0xF} | 0 | 1 | 1 |

*FIG. 10*

Lower Memory:

Truth Table 1100

| VERSION TABLE | | B Memory Stored Version Number | | |
|---|---|---|---|---|
| | | Reserved Subset 1 = {0x0} | B in {0x1 ... 0xE} | Reserved Subset 2 = {0xF} |
| A Memory Access Address Version Number from Processor | Reserved Subset 1 = {0x0} | 0 | 1 | 1 |
| | A in {0x1 ... 0xE} and A = B | 0 | 0 | 1 |
| | A in {0x1 ... 0xE} and A ≠ B | 0 | 1 | 1 |
| | Reserved Subset 2 = {0xF} | 0 | 1 | 0 |

*FIG. 11A*

Regain a state in the available set.

Truth Table 1110

| VERSION TABLE | | B Memory Stored Version Number | |
|---|---|---|---|
| | | Reserved Set = {0x0} | B in {0x1 ... 0xF} |
| A Memory Access Address Version Number from Processor | Reserved Set = {0x0} | 0 | 1 |
| | A in {0x1 ... 0xF} and A = B | 0 | 0 |
| | A in {0x1 ... 0xF} and A ≠ B | 0 | 1 |

*FIG. 11B*

Upper Memory:

Truth Table 1200

| VERSION TABLE | | B Memory Stored Version Number | | |
|---|---|---|---|---|
| | | Reserved Subset 1 = {0x0} | B in {0x1 ... 0xE} | Reserved Subset 2 = {0xF} |
| A<br>Memory Access Address Version Number from Processor | Reserved Subset 1 = {0x0} | 0 | 1 | 0 |
| | A in {0x1 ... 0xE} and A = B | 1 | 0 | 0 |
| | A in {0x1 ... 0xE} and A ≠ B | 1 | 1 | 0 |
| | Reserved Subset 2 = {0xF} | 1 | 1 | 0 |

Regain a state in the available set.

*FIG. 12A*

Truth Table 1210

| VERSION TABLE | | B Memory Stored Version Number | |
|---|---|---|---|
| | | Reserved Set = {0xF} | B in {0x0 ... 0xE} |
| A<br>Memory Access Address Version Number from Processor | Reserved Set = {0xF} | 0 | 1 |
| | A in {0x0 ... 0xE} A = B | 0 | 0 |
| | A in {0x0 ... 0xE} and A ≠ B | 0 | 1 |

*FIG. 12B*

MAXIMIZING ENCODINGS OF VERSION CONTROL BITS FOR MEMORY CORRUPTION DETECTION

BACKGROUND OF THE INVENTION

1. Field of the Invention

This invention relates to computing systems, and more particularly, to maximizing a number of available states for a version number used for memory corruption detection.

2. Description of the Relevant Art

Memory corruption occurs when the contents of a memory location are unintentionally modified due to programming errors. An example of this could be the access of a byte of memory past the end of the array of bytes reserved for a particular data structure. In addition, memory corruption may occur when the contents of a memory location are intentionally modified by a malicious attack. When the corrupted memory contents are used later in the computer program, it may lead either to a program crash or to strange program behavior. Regarding the first case, some programming languages include features such as explicit memory management and pointer arithmetic. These features allow development of efficient applications and system software. However, when a computer programmer incorrectly uses these features, memory corruption may occur. The programming languages C and C++ are two examples of such languages.

The behavior of programming languages may be categorized at least with type safety and memory safety. A computer programming language may be characterized as "type safe" when the language does not permit a computer programmer to use a value as a data type to which it does not belong. For example, a type safe programming language does not allow conversion of an integer variable to be a pointer value. The C programming language is one example of a "type unsafe" language due to casting, particularly the casting of pointers to void pointers and back. The C++ programming language includes most of the C programming language as a subset. Therefore, the C++ programming language inherits the "type unsafe" property.

A computer programming language may be characterized as "memory safe" when the language allows programs to release a portion of memory when it is determined the portion of memory is unused for the remainder of the program evaluation. A programming language that is "memory unsafe" may cause security vulnerabilities with random-access memory (RAM) access, such as buffer overflows and dangling pointers. Programming languages, such as C and C++, that support arbitrary pointer arithmetic, casting, and deallocation are typically "memory unsafe". Some high-level programming languages are memory safe due to disallowing pointer arithmetic and casting, and enforcing tracing garbage collection. However, programming efficiency may be reduced. Type safety typically depends on memory safety.

Many malicious attacks reduce system security through memory corruption. A pointer may be referred to as tainted if user input can be used as the pointer value. A security attack may be detected whenever a tainted value is de-referenced during program execution. Programming errors allow attackers to create memory corruption attacks, wherein these errors include vulnerabilities regarding buffer overflow, heap corruption (such as heap buffer overflow and double free), integer overflow, and format strings.

There are software solutions for memory corruption detection. Debugging tools such as Oracle Solaris Studio, Purify, Valgrind, and Insure++ perform this detection. However, these debuggers typically perform instrumentation of the computer program, which may cause program execution to run hundreds of times slower.

In view of the above, efficient methods and mechanisms for memory corruption detection are desired.

SUMMARY OF THE INVENTION

Systems and methods for maximizing a number of available states for a version number used for memory corruption detection are contemplated.

In one embodiment, during execution of a computer program, version numbers are associated with data structures, such as arrays, allocated in a physical memory. The physical memory may be a DRAM with a spare bank of memory reserved for a hardware failover mechanism. Adjacent allocated data structures have different version numbers. In one embodiment, the physical memory is partitioned into a plurality of regions. In one embodiment, a first region is a lower half of an address space and a second region is an upper half of an address space. The operating system (OS) may determine an associated reserved set of one or more version numbers for each one of the plurality of regions. The given reserved set for a given region may comprise one or more version numbers most likely to be used by an incorrect address indexing the given region. The OS may also determine an associated available set of one or more version numbers for each one of the plurality of regions, wherein a given available set for a given region comprises all other possible version numbers not included in an associated reserved set. In one embodiment, a given version number in a reserved set associated with a second region of the plurality of regions is in the available set associated with the first region.

The processor determines via an opcode that a fetched instruction is a memory access instruction corresponding to a first region of the plurality of regions within the physical memory. The processor generates an address corresponding to a location within the first region, wherein the address comprises a version number. The processor is configured to indicate no memory corruption error in response to at least detecting a version number stored in the identified memory location is in a reserved set associated with the first region.

These and other embodiments will become apparent upon reference to the following description and accompanying drawings.

BRIEF DESCRIPTION OF THE DRAWINGS

FIG. 4 is a generalized block diagram illustrating one embodiment of a truth table for a version number mismatch.

FIG. 10 is a generalized block diagram illustrating one embodiment of a truth table for a version number mismatch.

FIG. 11A is a generalized block diagram illustrating one embodiment of a truth table for a version number mismatch for accesses to a lower half of an address space.

FIG. 11B is a generalized block diagram illustrating another embodiment of a truth table for a version number mismatch for accesses to a lower half of an address space.

FIG. 12A is a generalized block diagram illustrating one embodiment of a truth table for a version number mismatch for accesses to an upper half of an address space.

FIG. 12B is a generalized block diagram illustrating another embodiment of a truth table for a version number mismatch for accesses to an upper half of an address space.

Figure 1:
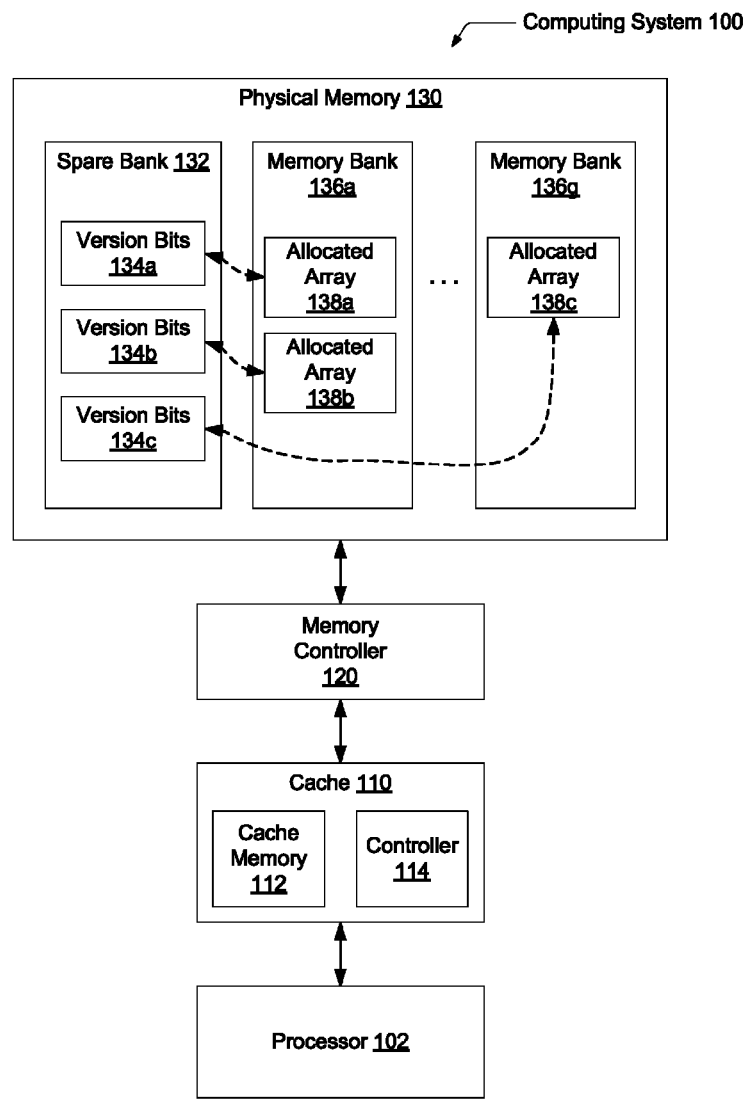
FIG. 1 is a generalized block diagram illustrating one embodiment of a computing system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, signals, computer program instruction, and techniques have not been shown in detail to avoid obscuring the present invention.

Referring to FIG. 1, a generalized block diagram illustrating one embodiment of a computing system 100 is shown. System 100 includes a processor 102 comprising one or more cores and one or more levels of a cache memory subsystem. System 100 also includes cache 110, which is within the memory subsystem, a memory controller 120 and physical memory 130. Physical memory 130 may be coupled to lower levels of a memory hierarchy, such as a disk memory and offline archive memory. These lower levels of memory are not shown for ease of illustration. Although only one processor 102 is shown coupled with an associated cache 110, it is possible and contemplated system 100 may include multiple processors and multiple associated caches coupled to a crossbar (not shown) to connect these components to one or more memory controllers. The one or more memory controllers are coupled to physical memory 130. In one embodiment, physical memory 130 comprises dynamic random access memory (DRAM). The DRAM may include one or more dual in-line memory module (DIMM) slots.

Each of the one or more cores within the processor 102 may include a superscalar microarchitecture with one or more multi-stage pipelines. Also, each core may be designed to execute multiple threads. For example, a multi-thread software application may have each of its software threads scheduled to be executed on a separate pipeline within a core, or alternatively, a pipeline may process multiple threads via control at certain function units.

In one embodiment, each of the cores within processor 102 includes circuitry for executing instructions according to a predefined general-purpose instruction set. For example, the SPARC® instruction set architecture (ISA) may be selected. Alternatively, the x86, x86-64®, Alpha®, PowerPC®, MIPS®, PA-RISC®, or any other instruction set architecture may be selected. Generally, each of the cores within processor 102 accesses an on-die level-one (L1) cache within a cache memory subsystem for data and instructions. The processor 102 may include multiple on-die levels (L2, L3 and so forth) of caches. If a requested block is not found in the on-die caches or in the off-die cache 110, then a read request for the missing block may be generated and transmitted to the memory controller 120. Interfaces between the different levels of caches may comprise any suitable technology. As shown in cache 110, each level of the caches may comprise a cache memory 112 for storing metadata and data. Additionally, each level may comprise a cache controller 114 for access control of the cache memory 112.

In one embodiment, the physical memory 130 may comprise error-correcting code (ECC) DRAM. The ECC-capable DRAM may detect and correct single-bit data errors and may detect double-bit data errors. Memory errors may be characterized as either soft errors or hard errors. The soft errors may be transient and occasional. With both the node capacitance and the supply voltage decreasing over time with the next generations of new processors, the amount of electrical charge stored on a node decreases. Due to this fact, nodes used for storage are more susceptible to radiation induced soft errors caused by high-energy particles such as cosmic rays, alpha particles, and neutrons. This radiation creates minority carriers at the source and drain regions of transistors to be transported by the source and drain diodes. The change in charge compared to the total charge, which is decreasing with each generation, stored on a node may be a large enough percentage that it surpasses the circuit's noise margin and alters the stored state of the node. Although the circuit is not permanently damaged by this radiation, a logic failure may occur. The hard errors may be permanent and may be found in the silicon or in the metallization of the dynamic RAM (DRAM) packaging.

Regardless of the type of error, the number of data bits in an error may alter the system behavior. Single-bit errors are usually correctable in an ECC memory system. For the above reasons, memories such as the DRAM in physical memory 130 may use error-correcting code (ECC) to detect and correct soft errors. The ECC DRAM may use additional bits called ECC bits to calculate parity information. The parity information is stored with the data bits in the DRAM. In one embodiment, the memory controller 120 calculates the parity information. When data is read from the DRAM, the memory controller 120 computes a new parity value and compares it with a stored parity value for the data being read. If there is a mismatch, then the memory controller 120 may detect the faulty bit and invert it. The error may be reported in a systems management log. If a multi-bit error occurs, the error may be detected and logged but not corrected. Multi-bit errors may be fatal if a system cannot recover from them.

Spare-bank memory and memory mirroring are other advanced mechanisms that enable systems to handle memory errors, such as multi-bit errors. In one embodiment, the physical memory 130 comprises a spare-bank DRAM. The spare-bank memory feature may be implemented in the memory controller 120 and the system basic input/output system (BIOS) software. This feature enables administrators to configure a spare row, or bank, of memory for spare use.

In one embodiment, if a number of correctable errors that occur within a certain time frame on a particular DIMM in any of the usable banks exceeds a given threshold set in the BIOS, then the BIOS instructs the memory controller 120 to copy the data from the failing bank to the spare bank. Then the memory controller 120 remaps the memory in the system. After the copy process has completed, the failing bank is no longer used. Instead the spare bank is used. As shown, the physical memory 130 may be partitioned into multiple logical banks, such as memory banks 136a-136g. The spare bank 132 may be used to replace one of the banks 136a-136g during failure of the one bank.

The physical memory 130 may store one or more software applications (not shown) that are later compiled and loaded into the cache memory subsystem. Generally speaking, for a given software application, the kernel of an operating system sets up an address space for the application, loads the application's code into the physical memory 130, sets up a stack for the application, branches to a given location inside the application, and begins execution of the application. Dynamic objects accessed with pointers may be allocated during program execution. As shown, one or more arrays 138a-138c of bytes may be allocated during the execution of one or more software applications. It is noted that while arrays are used herein for purposes of discussion, the methods and mechanisms described may be applied to other types of data structures as well.

In one embodiment, when no hardware failure of the DRAM occurs, each of the allocated arrays 138a-138c has associated version bits of the version bits 134a-134c stored in the spare bank 132. The spare bank 132 may be borrowed for the purpose of storing the version bits to be used for memory corruption detection. An access to a memory location within one of the allocated arrays 138a-138c by a read or a write operation causes the data stored in that memory location to be returned to the processor 102. The associated version bits for the accessed memory location may be returned to the processor along with the data. For example, if a memory location within the allocated array 138a is accessed, then the version bits 134a may be returned to the processor 102 along with the accessed data within the allocated array 138a.

Each memory access may utilize both an address and a version number indicated by the version bits. In one embodiment, when data is written to memory, the hardware in the processor 102, in the cache controller 114 or in the memory controller 120 may verify the version bits from the store operation match the associated version bits recorded in the spare bank 132. When data is loaded, a similar process may occur. An error may be flagged when a mismatch is found. Therefore, memory corruption is detected without software tools and without utilizing extra on-die real estate for the storage of the version bits 134a-134c.

Dangling pointers, which are also called stale pointers, are costly to detect with dynamic software monitoring tools, since instrumentation slows system performance. In addition, these tools may not detect all dangling pointers. As a consequence, silent memory corruption, such as reading and overwriting wrong data and buffer overflows are common sources of software bugs that threaten system availability and security. Reliable memory corruption detection is important for both the operating system (OS) and any database. Notifying a trap handler when a mismatch in the version bits occurs during a memory access allows the OS to take corrective action with little overhead.

In the event of a hardware memory failure in the DRAM in physical memory 130, the spare bank 132 may become active and begin to store program data. In this case, the version bits 134a-134c may no longer be stored and used for memory corruption detection. However, in this case, the system 100 may be soon shutdown, one or more DIMMs in the DRAM may be replaced and the system 100 may be restarted. Afterward, the spare bank 132 may be used again to store version numbers associated with allocated arrays. Before the system shutdown, in one embodiment, the physical memory 130 or the memory controller 120 may return a value of zero to the processor 102 for any associated version number for a memory access. The value of zero may indicate a "not set" state for the version number. In this case the hardware in the processor 102, the cache controller 114 and the memory controller 120 may not compare the version bits provided by the application against those provided by hardware. In one embodiment, the application may continue running although the memory location was not one that was supposed to be accessible through the pointer used by the software. In another embodiment, portions of the spare bank 132 may still store one or more of the version bits 134a-134c during a hardware failure. Returning a state value of "not set" for a given version number may depend on which portion of the spare bank 132 is used for hardware failure and which portion is still used for version number storage.

Figure 2:
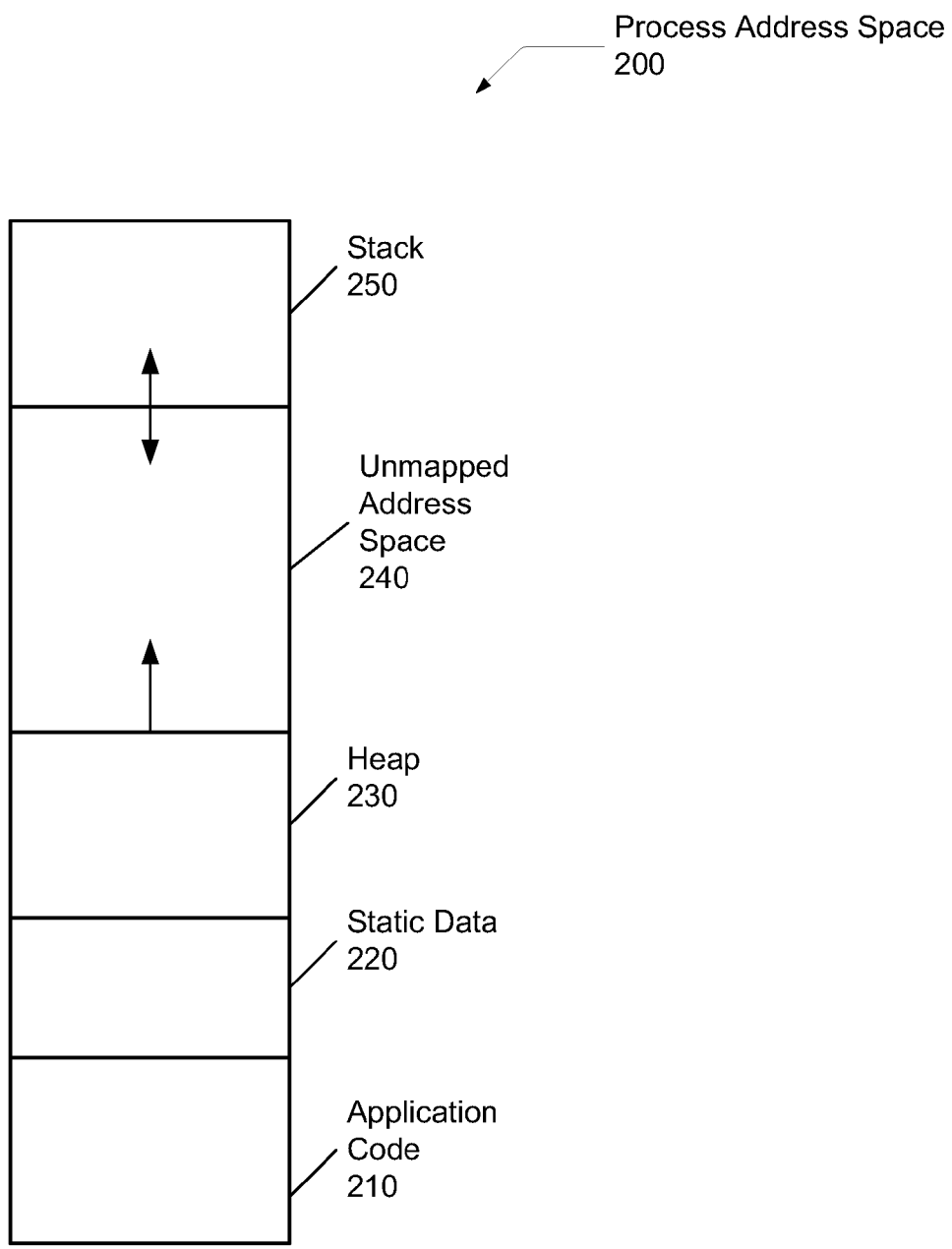
FIG. 2 is a generalized block diagram illustrating one embodiment of a process address space.

Referring now to FIG. 2, a generalized block diagram illustrating one embodiment of a process address space 200 is shown. As described above, the address space 200 for a given process may be a contiguous virtual address space, wherein a mapping between virtual addresses and physical addresses determines the location of data values and application code in physical memory 130. The interaction of compilers and high-level languages affects how a software application uses an instruction set architecture (ISA). Software application development uses a number of variables to be allocated and addressed and a number of registers used to allocate variables. In one embodiment, the static data 220, the stack 250, and the heap 230 determine data allocation for the application code 210.

The static data 220 may be used to allocate statically declared objects, such as global variables and constants. A majority of these objects may be arrays. The stack 250 may be used to allocate scalar variables rather than arrays, such as local variables and parameters in the functions currently being invoked. The stack 250 may be grown and shrunk on procedure call or return, respectively. The heap 230 may be used to allocate dynamic objects accessed with pointers and are typically not scalar variables. The heap 230 may be used to reduce the frequency of copying the contents of strings and lists by storing the contents of temporary strings or lists during the string/list operations. The heap is not affected by the return of the function call.

Figure 3:
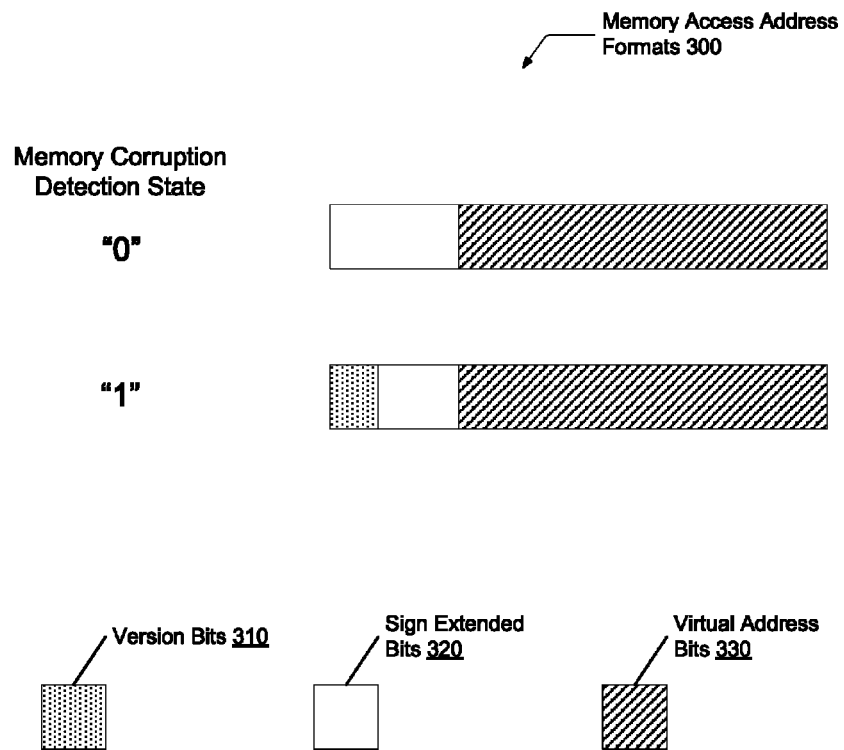
FIG. 3 is a generalized block diagram illustrating one embodiment of memory access address formats.

Turning now to FIG. 3, a generalized block diagram illustrating one embodiment of memory access address formats 300 is shown. Modern computing systems use virtual memory in order to share a smaller amount of physical memory among many processes. An address space may be a contiguous virtual address space, wherein a mapping between virtual addresses and physical addresses determines the location of stored data in physical memory.

When software allocates a region of memory, such as with a calloc or a malloc C++ subroutine used for dynamic memory allocation, a version number may be assigned to the allocated array. The subroutine and/or a heap manager may utilize a modified block initialization store instruction within an iterative loop to zero out the allocated array. This modified instruction may operate on a cache line basis. For example, 128 modified block store instructions may be used to allocate an 8-kilobyte (KB) array, wherein each cache line is 64 bytes. In addition, the modified block store instruction may cause an associated version number to be stored in spare bank 132 shown in FIG. 1.

In one embodiment, the OS is made aware of extra metadata being used for memory access operations through a state bit, such as a memory corruption detection (mcd) state bit. In one embodiment, when the mcd state bit is deasserted, the most-significant bit (MSb) of the virtual address bits 330 is sign extended to provide the sign-extended bits 320. In one embodiment, if the bits 320 do not equal a sign-extended value of the MSb of the virtual address bits 330, then an exception may occur.

In one embodiment, when the mcd state bit is asserted, the MSb of the virtual address bits 330 is sign-extended for a smaller portion of the total address. The sign-extended value 320 is smaller in this case. In one embodiment, the upper bits of the memory access address store an associated version number 310 to be used for later comparisons. In one embodiment, the memory access address is a 64-bit value. The virtual address 310 comprises bits 53 to 0. When the mcd state bit is asserted, the sign-extended value 320 comprises bits 59 to 54 and the version number 310 comprises bits 63 to 60. Although the bits in the memory access addresses are shown in this particular order, other combinations are possible and other or additional bits may be utilized as well. The bits storing information for the portions 310-330 may or may not be contiguous. Similarly, the arrangement of the portions 310-330 may use other placements for better design trade-offs.

In one embodiment, the possible values for a version number may be used in either an available set or a reserved set. The one or more version numbers in a reserved set may indicate either memory is not utilizing version numbers or memory is unable to utilize version numbers. For example, when a hardware failure occurs in the DRAM and a failover mechanism begins to use the spare bank 132, the stored version numbers may not be used anymore. In another example, an uncorrectable error has occurred and the memory does not return valid data.

In one embodiment, one value for the reserved set may be sufficient to handle the conditions described above. However, another version number value may be used in the reserved set to ease software adoption of the mcd state. For example, as shown in FIG. 2, the heap 230 may occupy a lower half of a virtual address space. In such a case, the most-significant bits of an associated virtual address may comprise binary 0's. The stack 250 and shared libraries may occupy an upper half of the virtual address space. The most-significant bits of an associated virtual address may comprise binary 1's. A single version number value in the reserved set may make it difficult for software, such as the OS, to determine if pointers to the upper half of the virtual address space have associated version numbers in the available set. For example, for a 4-bit version number 0xF, wherein 0x denotes a hexadecimal value, this value may indicate either an associated memory access address corresponds to a memory location with a version number equal to 0xF or the memory access address corresponds to a memory location that is not assigned a version number. To simplify logic, both a 0x0 value and a 0xF value may be placed in the reserved set. For the 4-bit version number example, the other values between 0x0 and 0xF may be placed in the available set.

Turning now to FIG. 4, a generalized block diagram illustrating one embodiment of a truth table 400 for a version number mismatch is shown. As described above, software may use the version number values in the available set for assigning version numbers to allocated arrays 138a-138c. In the truth table 400, the value "A" represents a version number received in a memory access, and "B" represents a version number stored in association with a memory location. In one embodiment, if a version number comprises 4 bits, a reserved set may be designated to include the two values 0x0 and 0xF, and an available set may include the fourteen values 0x1 to 0xE. A logic "1" in the truth table 400 may represent a version number mismatch between a version number received in a memory access address from a processor and an associated memory location. In response to detecting such a mismatch, a trap or other error reporting type condition may be indicated. A logic "0" in the truth table 400 may represent a version number match, or a condition in which no trap or error condition is indicated. For example, when an associated memory location stores a version number in a reserved set (e.g. B in {0x0, 0xF}), this may indicate version numbers are not being utilized for the corresponding storage location. In such a case, a trap or error condition may not be reported.

The rows in the truth table 400 may represent version numbers sent from a processor within a memory access address. These version numbers may be included in the memory access address as shown in FIG. 3. The top row in the truth table 400 corresponds to a received version number (A) which is included in the available set and is equal to a corresponding stored version number (B). In one embodiment, the version number includes 4 bits and the available set may include the fourteen values 0x1 to 0xE. The middle row in the truth table 400 corresponds to a received version number (A) which is included in the available set and is not equal to a corresponding stored version number (B). The bottom row in the truth table 400 corresponds to a received version number (A) which is in the reserved set.

The columns in the truth table 400 may represent version numbers stored in memory. The left-most column (B in {0x1 ... 0xF}) in the truth table 400 corresponds to a stored version number (B) which is in the available set. Similar to the bottom row of the truth table 400, the right-most column in the truth table 400 corresponds to a stored version number (B) which is in the reserved set.

As shown, when an associated memory location stores a version number from the reserved set of version numbers, a result of a comparison of version numbers may be invalid (e.g., the result of the comparison is not acted upon). Therefore, no mismatch is found and a logic "0" is used to denote no mismatch is found. The far-right column in the truth table 400 illustrates this condition. When a version number in a memory access address is both within the available set and matches a version number stored in an associated memory location, in one embodiment no error is reported and a logic "0" is used to denote an error is not found. The intersection of "A" in the top row and "B" in the left-most column of the truth table 400 indicates this condition. However, when a version number in a memory access address is within the available set but does not match a version number stored in an associated memory location, an error is found and a trap may be set. A logic "1" is used to indicate an error is found. The intersection of "A" in the middle row and "B" in the left-most column indicates this condition. In addition, an error may be found when the memory access address from a processor includes a version number in the reserved set. A logic "1" in the bottom row and the left-most column of the truth table 400 indicates this condition.

As shown in the truth table 400, a version mismatch may occur when a version number in a memory access address corresponding to a load or a store operation from the processor 102 is in the available set, but it does not match the version number stored in the spare bank 132 associated with the memory location identified by the memory access address. In addition, the version number stored in the spare bank 132 is in the available set for a mismatch to occur. When a version number stored in the spare bank 132 is within the reserved set, a mismatch does not occur as shown in the truth table 400.

Figure 5:
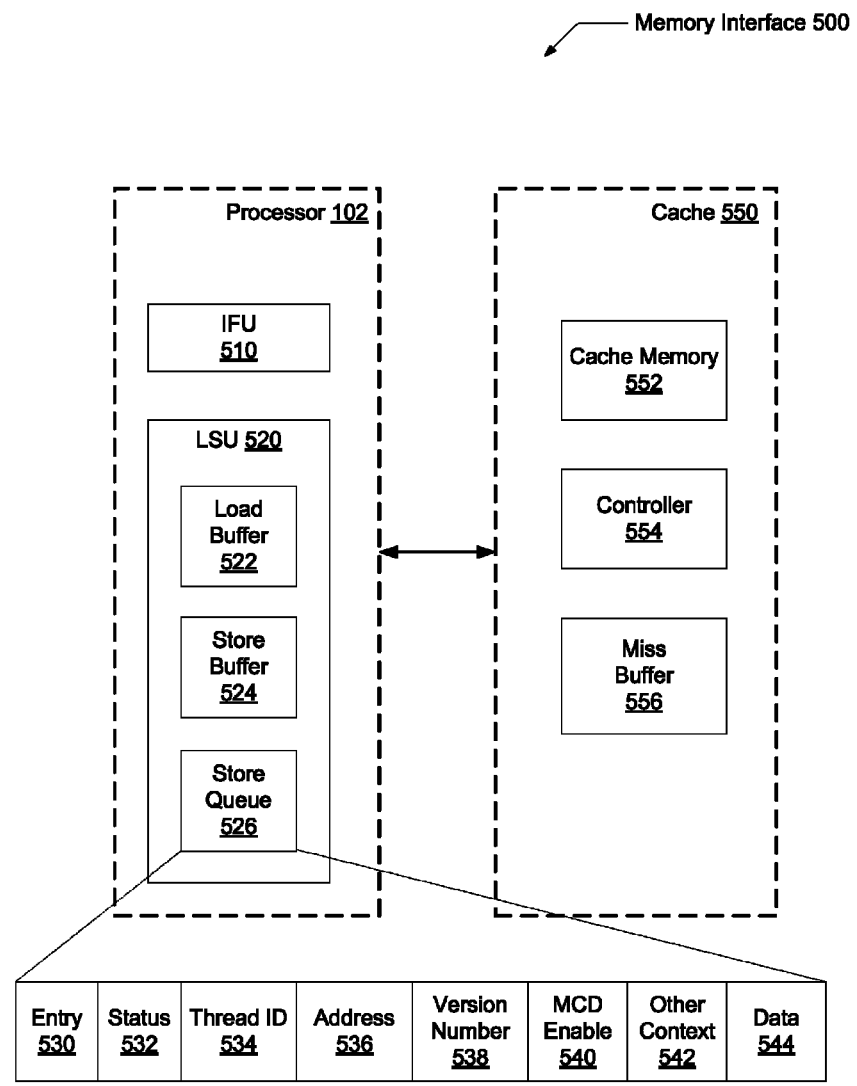
FIG. 5 is a generalized block diagram illustrating one embodiment of a memory interface illustrating different sources of memory requests.

Referring now to FIG. 5, a generalized block diagram illustrating one embodiment of a memory interface 500 illustrating different sources of memory requests is shown. It is noted the components shown in FIG. 5 illustrate a general organization and coupling of components, rather than an actual physical placement of the components. In one embodiment, a cache 550 comprises a cache memory 552, a cache controller 554 and a miss buffer 556. The cache 550 may correspond to an on-core L2 cache with an accompanying miss buffer 556.

Cache memory 550 may be larger than a previous level of memory in the hierarchy, such as an L1 cache in processor 102. Cache memory 550 may contain all of the cache lines of a previous level. In one embodiment, in order to remove complexity from a L1 cache, the L1 cache is implemented as a write-through cache and an L2 cache manages memory ordering and coherency issues. Therefore, memory requests within processor 102 may be sent to both a L1 cache and a L2 cache, such as cache 550.

Memory requests may originate at least from an instruction fetch unit (IFU) 510, a load buffer 522 and a store queue 526 within a load-store unit (LSU) 520. The IFU 510 may be configured to select a thread to be fetched and to fetch instructions from an instruction cache (i-cache) for the selected thread, which may correspond to an L1 cache with a corresponding L2 cache 550. A decoder (not shown) may be coupled to the IFU 510 to determine a type of instruction for each fetched instruction. An execution unit (not shown) in a multi-stage pipeline within processor 102 may generate an address for memory access operations. This address may include at least an associated version number for an array corresponding to the memory access operation. The store queue 526 may be configured to convey memory requests to the same L1 and L2 caches for chosen threads in order to write-out data of committed store instructions for a chosen thread. The load buffer 522 may be configured to convey memory requests to the same L1 and L2 caches for a chosen thread in order to read data of load instructions being executed.

In one embodiment, the miss buffer 556 comprises a plurality of entries that queues all read and write operations, such as load, fetch, and store instructions, which encounter conditions which prevent them from completing. For example, a requested cache line may not be present in cache memory 552. Alternatively, a requested cache line may be present in cache memory, but it does not have a particular cache coherency state. For example, cache memory 552 may be chosen to be a global ordering point for a memory model. In order to adhere to the rules of a memory model, there may need to be a global ordering point within the memory hierarchy, such as cache memory 552 that may be a L2 cache with an associated write-through L1 cache, that serves as the reference for all store operations. This global ordering point may be responsible for ensuring that all consumers will see a consistent and proper ordering of store operations. This is typically accomplished by requiring that a cache line be in an exclusive state before executing a store operation. If a cache line is not in an exclusive state, a cache miss occurs and an updated corresponding cache line may need to be acquired.

In one embodiment, the store queue (SQ) 526 holds all committed store instructions or operations of all threads in processor 102. When a store instruction commits, it typically is moved from the store buffer 524 to the store queue 526. In one embodiment, the store buffer 524 and the store queue 526 store the same fields 530-544. However, when a store instruction commits, the version number 538, the mcd enable state 540, and other context information 542 may no longer be associated with the address 536. Instead this information may be associated with the data 544. The buffered store operations may also be micro-operations, or micro-ops, if processor 102 is configured to divide instructions into two or more operations.

The store queue 526 may be used for read-after-write (RAW) hazard checking as all load instructions, or operations, may check the store queue 526 for RAW hazards prior to being issued. The data 544 holds the data of committed store instructions until these instructions write-out data to cache 550 and the corresponding data of the store instruction are now globally visible to all processors and threads within a computing system. For a particular load instruction, when a RAW hazard is detected in the store queue 526 for a particular entry, which has valid data, bypass may occur immediately.

The store queue 526 comprises a plurality of entries, wherein each entry corresponds to a store instruction. In one embodiment, each entry includes an entry number 530, status information 532, a thread identification (TID) number 534, an address 536, a version number 538, memory corruption detection enable state 540, and other context identifying information 542. The other context information 542 may include mcd enable checking state information on a thread basis. Although the fields are shown in this particular order, other combinations are possible and additional fields may be utilized. The bits storing information for the fields 530-542 may or may not be contiguous. Similarly, the arrangement of fields 530-542 may use other placements for better design trade-offs. The entry number 530 corresponds to the position of an entry in the store queue 526, wherein entry 0 may be configured to be at the top or at the bottom of the store queue 526 depending on logic preferences. The entry field 530 may be implied rather than an actual stored number. A resource tag, or store queue tag, corresponding to a single store instruction in a core pipeline within processor core 102 may be also held per entry in the store queue 526.

Status information 532 may comprise one or more valid bits and cache line MESI protocol information associated with corresponding data stored in the store buffer 524. A thread identifier (TID) 534 may be used to identify a corresponding thread for a particular store operation. In one embodiment, the address field 536 may hold a physical address and a byte mask. Entries may be written upon the retirement of a store instruction. Load instructions may initiate a content-addressable-memory (CAM) comparison operation, typically implemented via dynamic circuit logic, in order to check for an address overlap. In one embodiment, an address overlap occurs when the address 536 matches, the thread ID 534 matches, and any bit in the load mask has a match in the store mask. For entries with address overlap, the CAM will also check for full or partial matches. A full match occurs when each bit in the load mask has a corresponding bit in the store mask. Otherwise, the match is partial. The version number 538, the mcd enable state 540, and the other context information 542 may not participate in a typical CAM operation within the store buffer 524.

Figure 6:
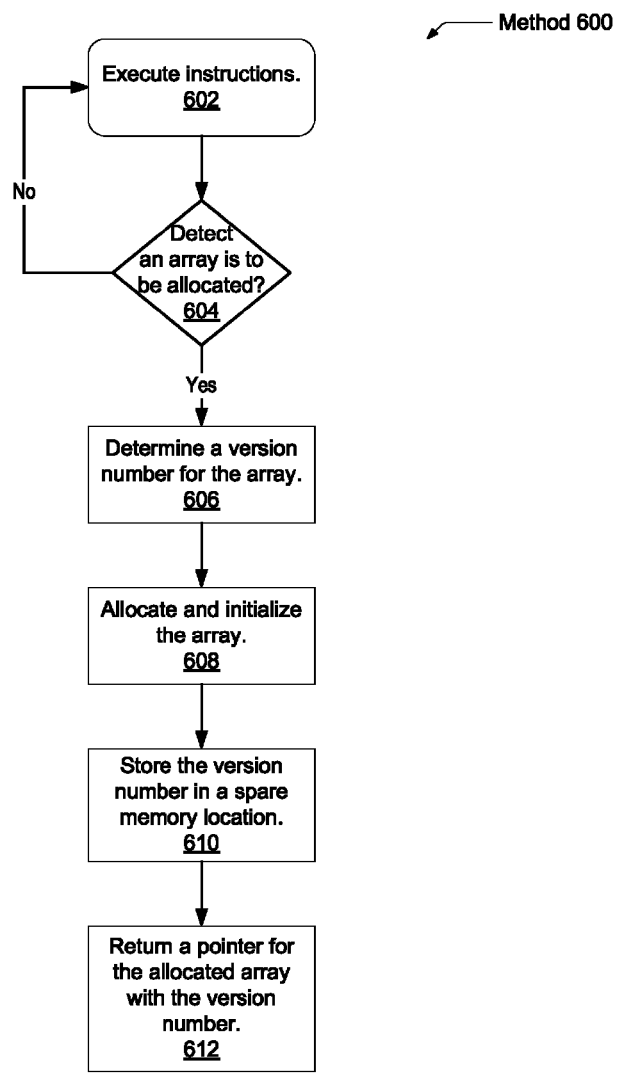
FIG. 6 is a generalized flow diagram illustrating one embodiment of a method for initializing an array with a version number.

Referring now to FIG. 6, a generalized flow diagram illustrating one embodiment of a method 600 for initializing an array with a version number is shown. The components embodied in system 100 described above may generally operate in accordance with method 600. For purposes of discussion, the steps in this embodiment are shown in sequential order. However, some steps may occur in a different order than shown, some steps may be performed concurrently, some steps may be combined with other steps, and some steps may be absent in another embodiment.

In block 602, the processor 102 may be executing instructions of one or more threads corresponding to one or more software applications. The processor 102 may fetch instructions concurrently for one or more threads. These fetched instructions are decoded. As described earlier, dynamic objects accessed with pointers may be allocated during program execution. In one embodiment, a calloc subroutine or a malloc subroutine used in the C and C++ programming languages is called for dynamic allocation of memory.

If an array of bytes to be allocated is detected during execution (conditional block 604), then in block 606, a version number is determined for the array. As described earlier, version numbers may belong to one of two categories, such as a reserved set and an available set. In one embodiment, a value within the available set of version numbers that has not already been assigned may be chosen. In one embodiment, the OS determines the values within each of the reserved set and the available set and chooses the version number for the array to be allocated. The OS may perform the determination and the selection when the OS receives an indication from the processor 102 that a dynamic memory allocation subroutine is being executed. In another embodiment, the processor 102 determines the values within each of the reserved set and the available set and chooses the version number for the array to be allocated. The processor may send the selected version number with an accompanying indication to the OS that a dynamic memory allocation subroutine is being executed.

In block 608, the subroutine for dynamic memory allocation is executed with a modified block initialization store instruction. The subroutine may use this instruction in an iterative loop. For example, 128 loop iterations, each with the modified block store instruction, may be used to allocate an 8 kilo-byte (KB) array, wherein each cache line allocated by a single iteration is 64 bytes. This modified block initialization instruction may store zeros to the entire cache line pointed to by the variable address. In one embodiment, the version number may be recorded in the upper bits of the address.

In block 610, during execution, the modified instruction may extract these upper bits and place these bits in a memory location in the spare bank 132 associated with a memory location in one of the memory banks 136a-136g identified by the remaining bits of the address. This version number may be carried along with an associated cache line throughout the entire memory system.

When the calloc, malloc or similar subroutine completes, in block 612, the subroutine returns a pointer value and a range of physical memory, which identifies the allocated and initialized array in virtual memory. In one embodiment, a lower portion of a register, such as the lower 54 bits, may be used to identify locations within a virtual memory. The subroutine may return the pointer value with the most significant bits holding the version number. For example, a 64-bit virtual address may hold a 4-bit version number in bits 63 to 60. References to the virtual memory using load and store instructions may be performed with this pointer value and the range of physical memory for the allocated array. Setting the bits in the pointer to hold the version number may be performed using logical operations. Setting the bits in the spare bank 132 in physical memory 130 may be performed by storing the version number value in each memory location in the spare bank 132 corresponding to the allocated array.

Figure 7:
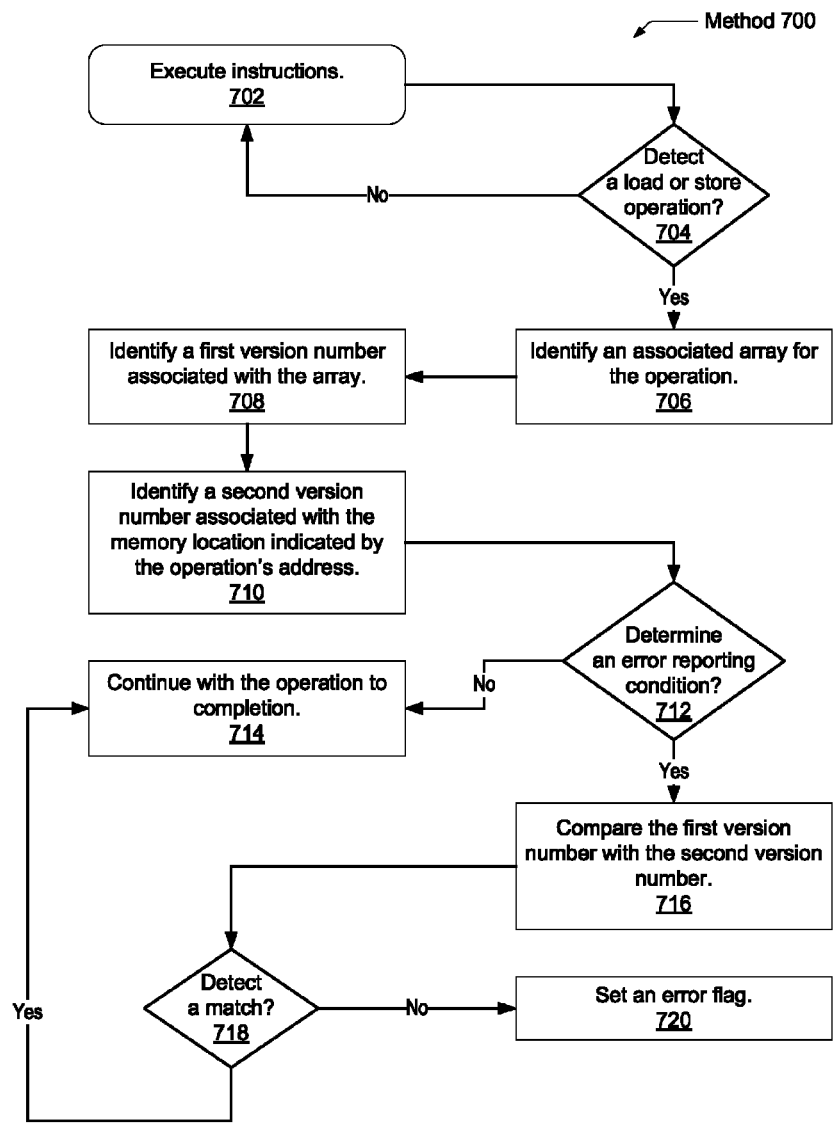
FIG. 7 is a generalized block diagram illustrating one embodiment of a method for executing memory access operations with a version number.

Referring now to FIG. 7, a generalized block diagram illustrating one embodiment of a method 700 for executing memory access operations with a version number is shown. The components embodied in system 100 described above may generally operate in accordance with method 700. For purposes of discussion, the steps in this embodiment are shown in sequential order. However, some steps may occur in a different order than shown, some steps may be performed concurrently, some steps may be combined with other steps, and some steps may be absent in another embodiment.

Similar to block 602 in method 600, in block 702, the processor 102 may be executing instructions of one or more threads corresponding to one or more software applications. If a memory access operation, such as a load or a store instruction, is detected during execution (conditional block 704), then in block 706, an associated array is identified for the operation. The associated pointer value returned in step 612 of method 600 may be additionally identified in this step.

In block 708, a first version number associated with the array is identified. For example, this first version number may be stored in the upper bits of the pointer value as described above. In block 710, a second version number is identified, wherein the second version number is associated with a memory location indicated by the memory access operation's address. For example, an array may be identified in block 706 and an associated pointer value identified in block 708. This array may hold 100 cache lines of information. The identified pointer value and the size of 100 cache lines may be both used to generate particular addresses. These particular addresses may correspond to memory access operations within an iterative loop in a computer program. For example, the pointer value may identify a cache line at the start of the array, such as Start+0. A cache line at the end of the array may be identified by the generic address Start+99 used as a simple illustration. However, memory corruption may cause an incorrect address to be used and a cache line identified by Start+100 may be accessed during the iterations of the loop.

In one embodiment, a memory corruption error reporting condition may include an asserted mcd state and determination that the second version number stored in memory is not a value in the reserved set. If this error reporting condition is false (conditional block 712), then in block 714, the memory access operation continues to execute to completion. If this error reporting condition is true (conditional block 712), then in block 716, the first version number is compared with the second version number.

In one embodiment, the above comparison is performed for a store instruction when the store instruction commits, reaches the head of the store queue, and is sent by a write-through mechanism to the L2 cache. The first version number is stored in the store address. The second version number is stored in the L2 cache. An associated L2 cache controller may perform the comparison of the first version number and the second version number. For a load instruction, a core within the processor 102 may send a load address with the first version number to the L1 cache. A returned cache line from the L1 cache may store the second version number. The core within the processor 102 may compare the first version number and the second version number. In one embodiment, no comparisons may be performed for prefetched cache lines until an executing computer program actually requests these prefetched lines.

If the above comparison finds a match (conditional block 718), then control flow of method 700 moves to block 714 where the memory access operation continues to completion. If the above comparison finds a mismatch (conditional block 718), then in block 720, an error flag or trap is set.

In one embodiment, a trap logic unit (TLU) within a core of the processor 102 may be configured to receive notification of an exceptional event occurring during execution of a particular thread, such as the mismatch found during the above comparison. For a load instruction, the mismatch may be found and reported by circuitry within the processor 102 corresponding to a load buffer. For a store instruction, the mismatch may be found and reported by a cache controller associated with the L2 cache as described above. The cache controller may send an indication to a core within the processor 102 corresponding to a found mismatch. The load-store unit (LSU) 520 may store information identifying a given store operation that commits and leaves the store queue 526 in case the given store operation later causes the trap. The identifying information may be used for later debugging processes.

The TLU may cause execution control of that thread to vector to a supervisor-mode software handler (i.e., a trap handler) corresponding to the detected event. In one embodiment, the TLU may be configured to flush all instructions from the trapping thread from any stage of processing within an associated core within the processor 102 without disrupting the execution of other, non-trapping threads.

Figure 8:
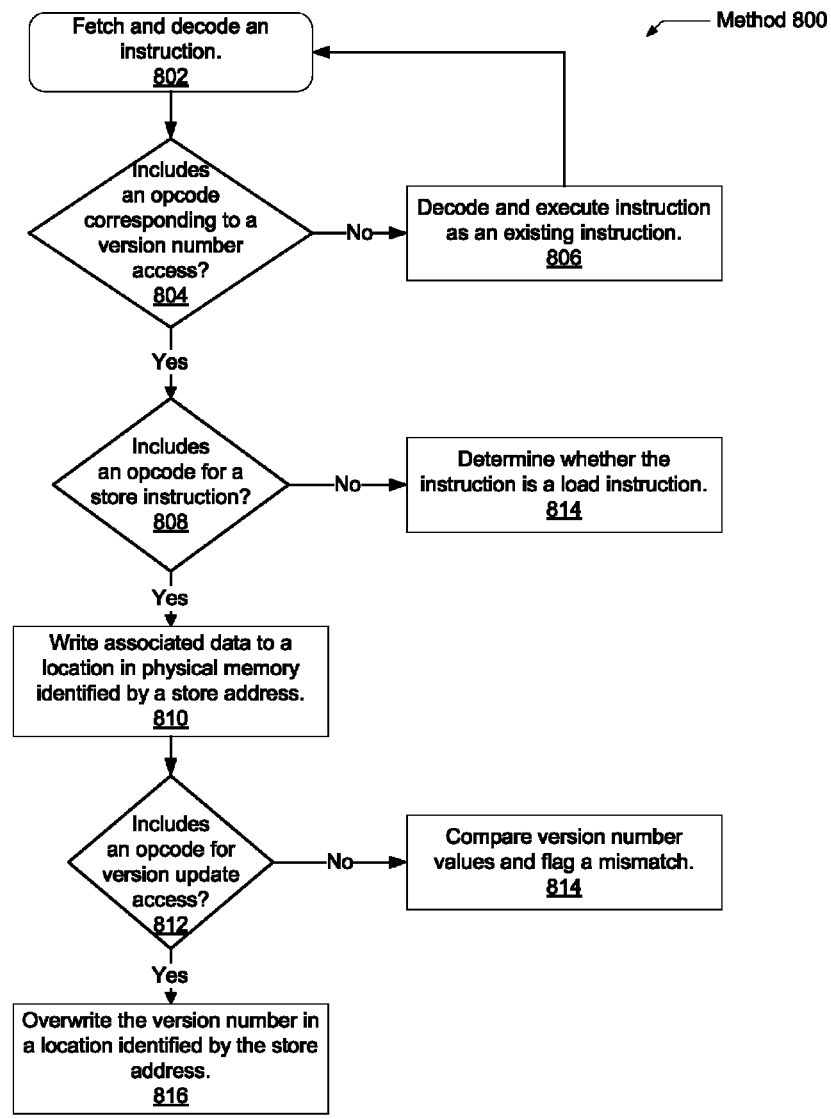
FIG. 8 is a generalized flow diagram illustrating one embodiment of a method for executing memory access operations that update a version number.

Turning now to FIG. 8, a generalized flow diagram illustrating one embodiment of a method 800 for executing memory access operations that update a version number is shown. The components embodied in system 100 described above may generally operate in accordance with method 800. For purposes of discussion, the steps in this embodiment are shown in sequential order. However, some steps may occur in a different order than shown, some steps may be performed concurrently, some steps may be combined with other steps, and some steps may be absent in another embodiment.

In block 802, a processor may be executing instructions of a software application. An instruction may be fetched alone or in combination with other instructions in a memory line. If an opcode of a fetched instruction corresponds to a version number access (conditional block 804), such as a memory access instruction, then the type of instruction may be next determined. If the opcode of the fetched instruction is not a store instruction (conditional block 808), then in block 814, a decoder may determine whether the fetched memory access instruction is a load instruction. If so, the method 900 may be used to execute the load instruction, which is described further below. If not, then an exception may be flagged, since a memory access instruction may only read or write locations in memory.

If the opcode of the fetched memory access instruction is a store instruction (conditional block 808), then in block 810, the store data when available is written to a location in physical memory identified by a store address. If the instruction is a block initialization store instruction, then the store data may be zeros used to initialize a cache line in a newly allocated array. Otherwise, the store data may correspond to data of a committed store instruction.

If the fetched store instruction does not correspond to a version update access (conditional block 812), then in block 814, the version numbers in the store address and the physical memory may be compared. This step is equivalent to block 716 and subsequent blocks in method 700. If the fetched store instruction corresponds to a version update access (conditional block 812), then in block 816, the version number in a location identified by the store address may be overwritten with a version number within the store address. This type of store instruction may be used to copy a first region of physical memory to a second region of physical memory. In addition, this type of store instruction may be used to bring a given region of memory from a disk to the physical memory. A comparison of version numbers may not be performed during execution of this type of store instruction.

Figure 9:
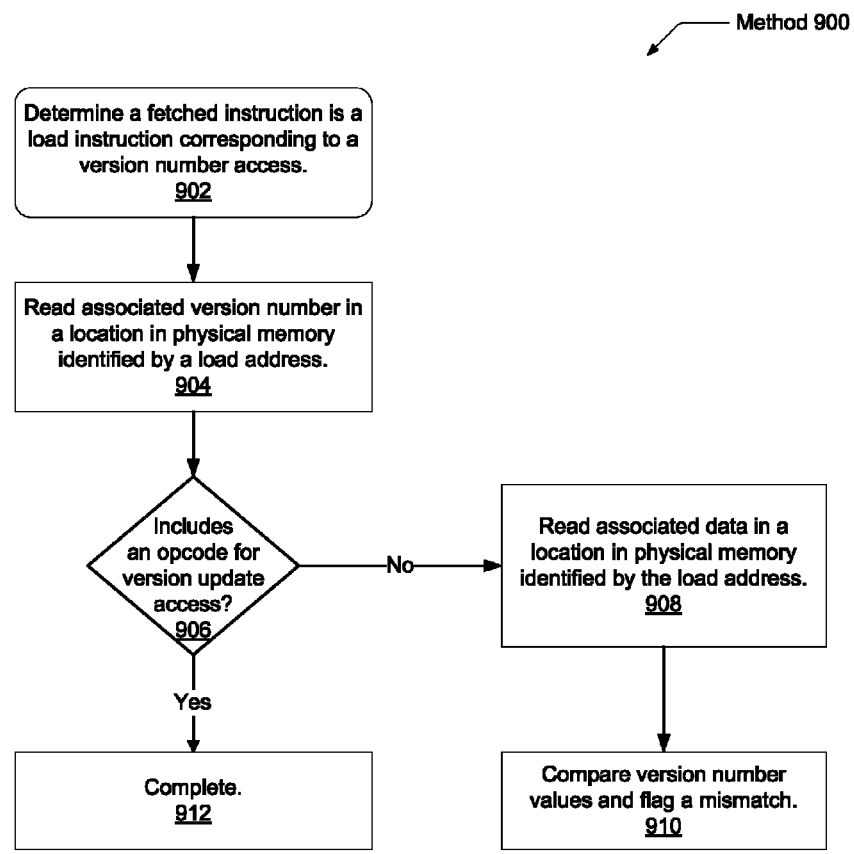
FIG. 9 is a generalized flow diagram illustrating another embodiment of a method for executing memory access operations that update a version number.

Turning now to FIG. 9, another embodiment of a method 900 for executing memory access operations that update a version number is shown. The components embodied in system 100 described above may generally operate in accordance with method 900. For purposes of discussion, the steps in this embodiment are shown in sequential order. However, some steps may occur in a different order than shown, some steps may be performed concurrently, some steps may be combined with other steps, and some steps may be absent in another embodiment.

In block 902, a fetched instruction is determined to be a load instruction corresponding to a version number access. This step may correspond to block 814 in method 800. In block 904, the processor reads a version number from a location in physical memory identified by the load address. If the opcode for the fetched load instruction corresponds to a version update (conditional block 906), then in block 912, execution of the instruction completes when the read version number is stored in a destination register. This load instruction may be used to read the version number for a later store to a different location in physical memory, such as for a copy operation.

If the opcode for the fetched load instruction does not correspond to a version update (conditional block 906), then in block 908, the data in a location in physical memory identified by the load address is read into a destination register. In block 910, the version numbers in the load address and the physical memory may be compared. This step is equivalent to block 716 and subsequent blocks in method 700.

Turning now to FIG. 10, a generalized block diagram illustrating one embodiment of a truth table 1000 for a version number mismatch is shown. In one embodiment, a reserved set of version numbers may be split into multiple subsets. One or more subsets within the reserved set may be used to indicate a condition that during memory accesses version numbers are not compared. A hardware failure in DRAM is one example of this type of condition. These subset values for a version number may be stored in physical memory and the cache memory subsystem. Alternatively, the memory controller 120 may return the subset value during a memory access following a hardware failure. No error may be flagged and indicated to a trap handler for this case. As described above for the truth table 400 in FIG. 4, the values "A" and "B" may represent members of the available set. In one example, when a version number comprises 4 bits, a reserved set may include the 2 values 0x0 and 0xF, and an available set may include the 14 values 0x1 to 0xE.

Similar to the truth table 400, a logic "1" in the truth table 1000 may represent a version number mismatch between version numbers within an available set in a memory access address from a processor and an associated memory location. A trap may be set in such a case. In addition, when a memory location stores a version number from a particular reserved subset, an error may have occurred and a logic "1" in the truth table 1000 illustrates this condition in the right-most column. A logic "0" in the truth table 1000 may represent a version number match within the available set. Alternatively, a logic "0" in the truth table 1000 may represent a condition wherein a result of comparing version numbers is invalid. For example, when an associated memory location stores a version number in a particular reserved subset, a result of a comparison may not be valid. The left-most column in the truth table 1000 may indicate this condition.

Similar to the truth table 400 described above in FIG. 4, the rows in the truth table 1000 may represent version numbers sent from a processor within a memory access address. These version numbers may be included in the memory access address as shown in FIG. 3. The top row in the truth table 1000 may represent one or more members of a reserved subset of version numbers stored within a memory access address. In one embodiment, the version number includes 4 bits and a first given reserved subset may include the value 0x0. The second and third rows may represent a member of the available set of version numbers stored within a memory access address and is denoted by the value "A". The second row in the truth table 1000 may represent a condition wherein the version number stored within the memory access address matches a version number within the available set stored in an associated memory location. The third row in the truth table 1000 may represent a condition wherein the version number stored within the memory access address does not match a version number within the available set stored in an associated memory location. The bottom row in the truth table 1000 may represent a member of a second reserved subset of version numbers stored within a memory access address. In one embodiment, the version number includes 4 bits and the second reserved subset may include the value 0xF.

Similar to the truth table 400 described above in FIG. 4, the columns in the truth table 1000 may represent version numbers stored in memory. Similar to the top row in the truth table 1000, the left-most column in the truth table 1000 may represent a member of a first given reserved subset. The middle column may represent a member of the available set of version numbers and is denoted by the value "B". Similar to the bottom row of the truth table 1000, the right-most column in the truth table 1000 represents the one or more members of the second reserved subset of version numbers.

Continuing with the subsets within a reserved set of version numbers, one or more other subsets within the reserved set may indicate a value not to be used during access to a particular region of an address space. As previously discussed, in various embodiments when version numbers are not used in a memory access address, the upper bits may be sign extended using the MSb of the virtual address bits 330. Therefore, an incorrect pointer created by erroneous programming or a deliberate malicious attack may contain sign extended values for the upper bits that typically hold a version number. When a 4-bit version number is used, an erroneous pointer to the lower half of an address space may include 0x0 in the upper bits that hold the version number. An erroneous pointer to the upper half of an address space may include 0xF in the upper bits that hold the version number. In one embodiment, a heap is placed in the lower half of an address space. The stack and shared libraries may be placed in the upper half of an address space. If there was only one value in the reserved set of version numbers, such as the value 0x0, then it may be difficult for software to determine whether memory access addresses indexing the upper half of the address space had a valid version number added. The value 0xF in the upper bits of the memory access address may be assigned a version number of 0xF. Alternatively, the value 0xF in this case may indicate the upper bits of the memory access address have been sign-extended.

Continuing with the selection of values to place in a reserved set of version numbers, the value 0x0 may be placed in a first reserved subset and the value 0xF may be placed in the second subset within the reserved set of version numbers. In this case, the value 0x0 is already chosen to indicate a condition that during memory accesses version numbers are not compared. Therefore, in this example, the reserved set of version numbers includes a first subset comprising the value 0x0 and a second subset comprising the value 0xF. The available set of version numbers includes the values 0x1 to 0xE. Again, the software may use the version number values in the available set for assigning version numbers to allocated arrays 138a-138c.

As shown, when an associated memory location stores a version number from the first reserved subset of version numbers, a result of a comparison of version numbers may be invalid. Therefore, no mismatch is found and a logic "0" is used to denote no mismatch is found. The left-most column in the truth table 1000 illustrates this condition. When an associated memory location stores a version number from the second reserved subset of version numbers, an error has occurred and a logic "1" is used to flag the error. The far-right column in the truth table 1000 illustrates this condition. When a version number in a memory access address is both within the available set and matches a version number stored in an associated memory location, no error is found and a logic "0" is used to denote an error is not found. The intersection of "A" in the second row and "B" in the middle column of the truth table 1000 indicates this condition. However, when a version number in a memory access address is within the available set but does not match a version number stored in an associated memory location, an error is found and a trap may be set. A logic "1" is used to indicate an error is found. The intersection of "A" in the third row and "B" in the middle column indicates this condition. In addition, an error may be found when the memory access address from a processor includes a version number in the second reserved subset. A logic "1" in the bottom row and the middle column of the truth table 1000 indicates this condition.

As shown in the truth table 1000, a version mismatch may occur when a version number in a memory access address corresponding to a load or a store operation from the processor 102 is in the available set, but it does not match the version number stored in the spare bank 132 associated with the memory location identified by the memory access address. In addition, the version number stored in the spare bank 132 is in the available set for a mismatch to occur. When a version number stored in the spare bank 132 is within the first subset of reserved set as described above, a mismatch does not occur as shown in the table.

In the above example with a 4-bit version number, 2 of the possible 16 states are removed from the available set of version numbers leaving 14 states from the value 0x1 to the value 0xE to be used for available version numbers. Adjacent allocated arrays in an address space may have different version numbers. The more values that are placed in the available set of version numbers, the less likely it may be that by chance an incorrect memory access address is allowed to access a region of an address space without setting a trap.

Referring now to FIG. 11A, a generalized block diagram illustrating one embodiment of a truth table 1100 for a version number mismatch for accesses to a lower half of an address space is shown. Similar to the truth tables 400 and 1000 described above in FIG. 4 and FIG. 10, the rows in the truth table 1100 may represent version numbers sent from a processor within a memory access address. In addition, the columns in the truth table 1100 may represent version numbers stored in memory. Each of the rows and each of the columns in table 1100 may represent same values as the values described above for table 1000. The error and mismatch results shown in table 1100 may be the same as described above for table 1000, except for the result in the bottom row and the far-right column. This result is further described below. Similar to truth tables 400 and 1000, as shown in the truth table 1100, a version mismatch may occur when a version number in a memory access address corresponding to a load or a store operation from the processor 102 is in the available set, but it does not match the version number stored in the spare bank 132 associated with the memory location identified by the memory access address.

In the example shown, similar to tables 400 and 1000, a version number may comprise 4 bits and a reserved set of version numbers may include two subsets. For accesses to a lower half of an address space, the MSb of the virtual address 330 may have the value of a binary 0. The first subset within the reserved set may include the value 0x0. When a hardware failure occurs, this value may be used to indicate this condition. No error is flagged when a memory location being accessed in the physical memory stored this value for its version number. However, the second subset within the reserved set may not indicate a reserved value. Therefore, the available set of version numbers includes 15 states, rather than 14 states. These 15 states include the value 0x1 to the value 0xF. The logic "1" results in the far-right column may be due to mismatches of values within the expanded available set. The logic "0" in the bottom row and far-right column may be due to a match of values within the available set. Referring now to FIG. 11B, a generalized block diagram illustrating another embodiment of a truth table 1110 for a version number mismatch for accesses to a lower half of an address space is shown. The truth table 1110 has the same state outputs as the truth table 1100, but table 1110 shows the value 0xF as an available state for the lower half of an address space, rather than as a subset of a reserved set for the entire address space.

Referring now to FIG. 12A, a generalized block diagram illustrating one embodiment of a truth table 1200 for a version number mismatch for accesses to an upper half of an address space is shown. Similar to the truth tables 400, 1000 and 1100 described above, the rows in the truth table 1200 may represent version numbers sent from a processor within a memory access address. In addition, the columns in the truth table 1200 may represent version numbers stored in memory. Each of the rows and each of the columns in table 1200 may represent same values as the values described above for table 1000. Similar to truth tables 400, 1000 and 1100, as shown in the truth table 1200, a version mismatch may occur when a version number in a memory access address corresponding to a load or a store operation from the processor 102 is in the available set, but it does not match the version number stored in the spare bank 132 associated with the memory location identified by the memory access address.

In the example shown, similar to tables 400 and 1000, a version number may comprise 4 bits and a reserved set of version numbers may include two subsets. For accesses to an upper half of an address space, the MSb of the virtual address 330 may have the value of a binary 1. The second subset within the reserved set may include the value 0xF. When a hardware failure occurs, this value may be used to indicate this condition. No error is flagged when a memory location being accessed in the physical memory stored this value for its version number. Each of the values of logic "0" in the far-right column indicates this condition. However, the first subset within the reserved set, which includes the value 0x0, may not indicate a reserved value for the upper half of memory. Therefore, the available set of version numbers includes 15 states, rather than 14 states. These 15 states include the value 0x0 to the value 0xE. The logic "1" results in the left-most column may be due to mismatches of values within the expanded available set. The logic "0" in the top row and left-most column may be due to a match of values within the available set.

Referring again to FIG. 10, the truth table 1000 allows 14 states to be used in the available set of version numbers. By utilizing the truth tables 1100 and 1200 for the lower half and the upper half of an address space, respectively, the number of states used in the available set of version numbers increases from 14 states to 15 state. When accessing the lower half of the address space, the available states range from the values 0x1 to 0xF. When accessing the upper half of the address space, the available states range from the values 0x0 to 0xE. Referring now to FIG. 12B, a generalized block diagram illustrating another embodiment of a truth table 1210 for a version number mismatch for accesses to an upper half of an address space is shown. The truth table 1210 has the same state outputs as the truth table 1200, but table 1210 shows the value 0x0 as an available state for the upper half of an address space, rather than as a subset of a reserved set for the entire address space.

Figure 13:
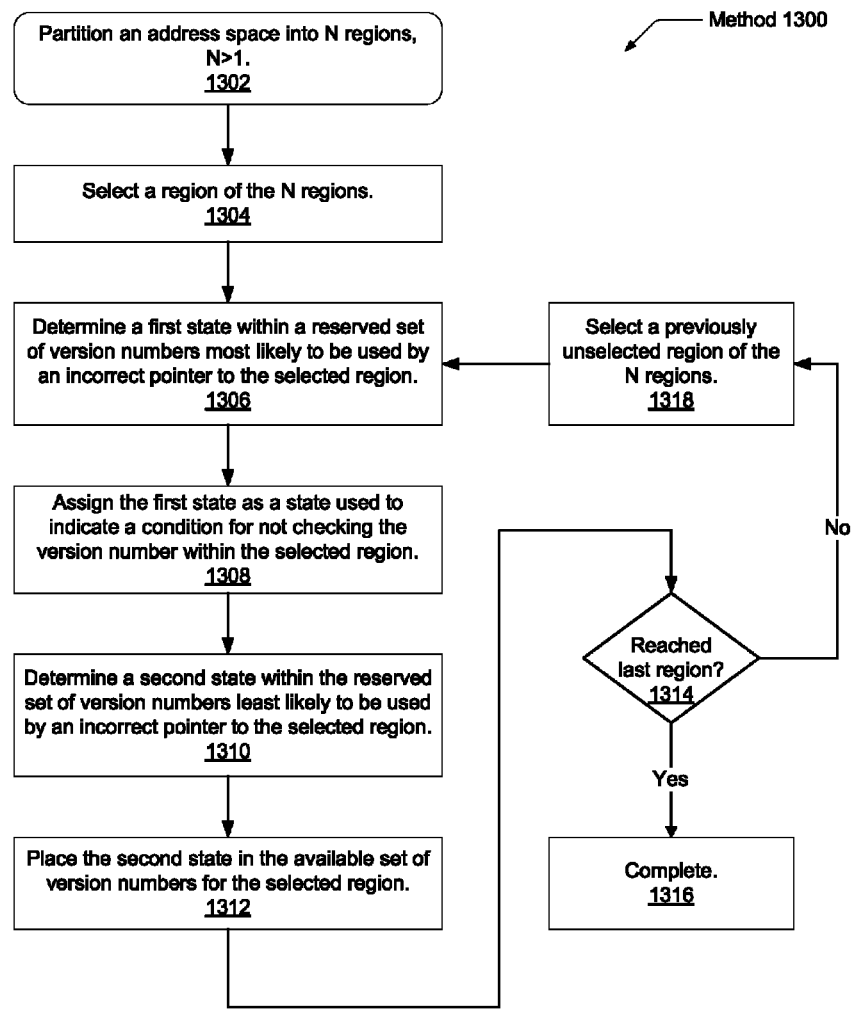
FIG. 13 is a generalized flow diagram illustrating one embodiment of a method for assigning values to each of an available set and a reserved set of version numbers.

Turning now to FIG. 13, one embodiment of a method 1300 for assigning values to each of an available set and a reserved set of version numbers is shown. For purposes of discussion, the steps in this embodiment are shown in sequential order. However, some steps may occur in a different order than shown, some steps may be performed concurrently, some steps may be combined with other steps, and some steps may be absent in another embodiment.

In block 1302, an address space is partitioned into N regions, wherein N is an integer greater than 1. In one embodiment, an address space may be partitioned into 2 regions, such as a lower half and an upper half. In block 1304, one of the N regions is selected. For example, the lower half of the address space may be initially selected. In block 1306, a determination is made to identify a first state within a reserved set of version numbers most likely to be used by an incorrect pointer to the selected region. For example, for the lower half of an address space, a 4-bit version number with the value 0x0 may be most likely to be placed in the upper bits of an incorrect memory access address targeting a memory location in the lower half of the address space.

In block 1308, the determined first state may be assigned as a state used to indicate a condition for not checking the version number within the selected region. For example, the first state may be used to indicate a hardware failure occurred within the physical memory or a memory corruption detection mode is currently not being used. In block 1310, a determination is made to identify a second state within a reserved set of version numbers least likely to be used by an incorrect pointer to the selected region. For example, for the lower half of an address space, a 4-bit version number with the value 0xF may be least likely to be placed in the upper bits of an incorrect memory access address targeting a memory location in the lower half of the address space.

In block 1312, the identified second state is placed in the available set of version numbers for the selected region. By moving the identified second state from the reserved set to the available set of version numbers, an extra state is regained in the available set. For example, referring again to FIG. 11, the truth table 1100 shows a regained state for the available set when the value 0xF is used in both a memory access address and storage in the physical memory. If the last region is reached (conditional block 1314), then in block 1316, any changes to the assignments of states to the available set and to the reserved set for the N regions is complete. If the last region is not reached (conditional block 1314), then in block 1318, a previously unselected region of the N regions is selected. Control flow of method 1300 then returns to block 1306. For example, the upper half of the address space may be selected and the values shown in the truth table 1200 shown in FIG. 12 may be selected.

Figure 14:
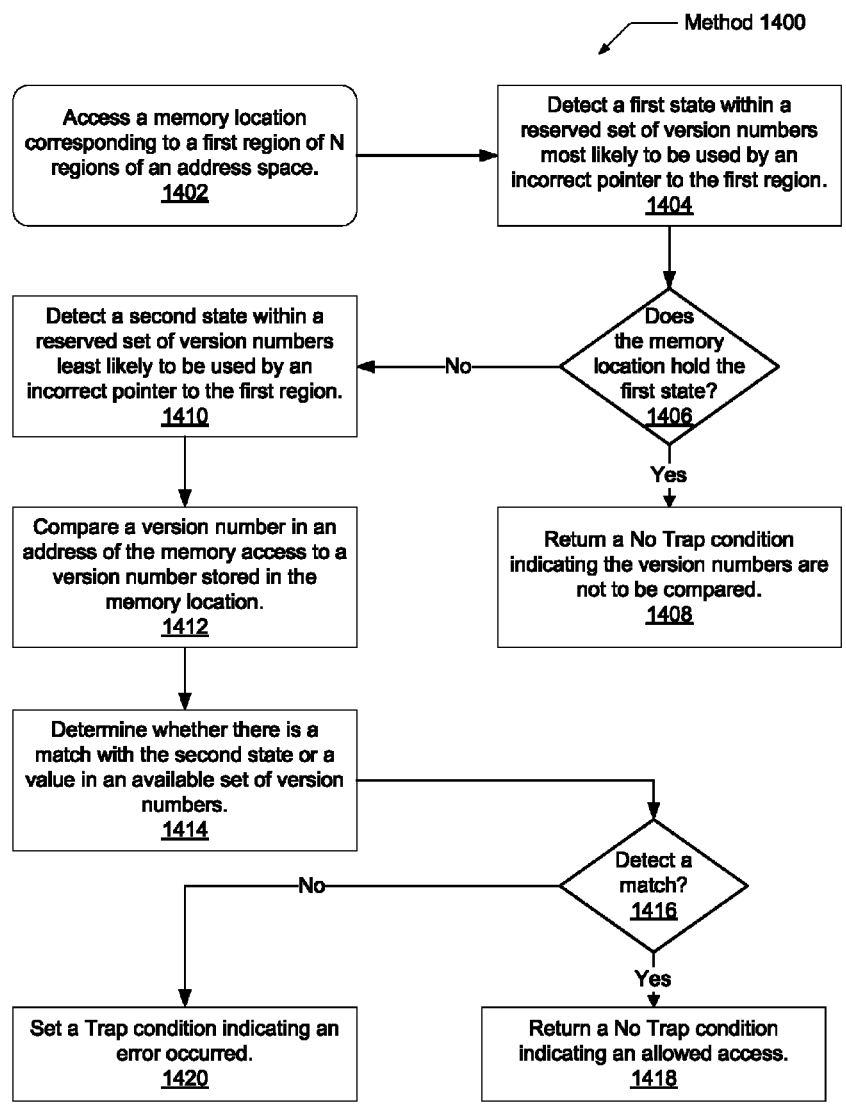
FIG. 14 is a generalized flow diagram illustrating one embodiment of a method for determining whether to set a trap condition to flag an error using version numbers.

Turning now to FIG. 14, one embodiment of a method 1400 for determining whether to set a trap condition to flag an error using version numbers is shown. For purposes of discussion, the steps in this embodiment are shown in sequential order. However, some steps may occur in a different order than shown, some steps may be performed concurrently, some steps may be combined with other steps, and some steps may be absent in another embodiment.

As program instructions execute, in block 1402, a memory access instruction accesses a memory location corresponding to a first region of N regions of an address space. For example, a memory access operation may access the upper half of an address space. In block 1404, hardware detects a first state within a reserved set of version numbers most likely to be used by an incorrect pointer to the first region. The hardware may include the processor 102, the off-die cache controller 114 or the memory controller 120. As described earlier, this value may indicate a hardware failure in the physical memory or a memory corruption detection mode is not asserted. In one example, the first region is the upper half of the address space and the first state comprises a 4-bit value 0xF. The hardware may identify this first state value particular to the accessed region, which is the first region. In one embodiment, the hardware may store particular state values in a table indexed by an identifier of the accessed region.

If the corresponding memory location stores the first state as a version number (conditional block 1406), such as in the spare bank 132, then in block 1408, a No Trap condition is detected, wherein the version numbers may not be compared. If the corresponding memory location does not store the first state as a version number (conditional block 1406), then in block 1410, hardware detects a second state within a reserved set of version numbers least likely to be used by an incorrect pointer to the first region. Continuing with the above example, the first region is the upper half of the address space and the second state comprises a 4-bit value 0x0. In one embodiment, the value of the second state may be found simultaneously with the value of the first state by accessing the table that is described above. An identifier for the accessed region may index this table.

In block 1412, the hardware compares a version number stored in an address of the memory access to a version number stored in the memory location identified by the memory access address. In block 1414, the hardware determines whether the version number in the memory access address matches the second state or a value in an available set of version numbers. If the hardware detects a match (conditional block 1416), then in block 1418, a No Trap condition is found and the memory access is allowed to proceed to completion. If the hardware detects a mismatch (conditional block 1416), then in block 1420, the hardware sets a Trap condition to be conveyed to a trap handler. The trap indicates an error occurred during the memory access, such as memory corruption.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computing system comprising:
   a processor;
   a physical memory coupled to the processor; and
   an operating system (OS), wherein the OS is configured to:
      partition the memory into a plurality of regions;
      determine a reserved set of one or more version numbers for each one of the plurality of regions; and
      determine an available set of one or more version numbers for each one of the plurality of regions, wherein an available set for a given region comprises version numbers not included in a reserved set for the given region;
   wherein the processor is configured to:
      generate a first address to identify a memory location in a first region of the plurality of regions, wherein the first address comprises a first version number; and
      detect an error responsive to determining the version number is in a reserved set of version numbers for the first region.

2. The computing system as recited in claim 1, wherein a second version number in a reserved set associated with a second region of the plurality of regions is in the available set associated with the first region.

3. The computing system as recited in claim 1, wherein the first region corresponds to a lower half of an address space and the second region corresponds to an upper half of an address space.

4. The computing system as recited in claim 1, wherein a version number in a reserved set for a particular region has all bits equal to uppermost bits of addresses corresponding to the particular region.

5. The computing system as recited in claim 1, wherein the processor is configured to indicate no memory corruption error in response to detecting the first version number is in an available set of version numbers for the first region.

6. The computing system as recited in claim 5, wherein the processor is further configured to indicate a memory corruption error in response to determining the first version number is not equal to a version number previously stored in association with the first address.

7. The computing system as recited in claim 6, wherein the version number previously stored in association with the first address is stored in a spare memory bank that corresponds to a memory bank storing data associated with the first address.

8. The computing system as recited in claim 1, wherein the processor is further configured to:
   complete a memory access operation using the identified memory location in response to determining there is no memory corruption error; and
   send an indication to a trap handler in response to determining there is a memory corruption error.

9. A method for a computing system, the method comprising:
   partitioning a memory into a plurality of regions;
   determining a reserved set of one or more version numbers for each one of the plurality of regions; and
   determining an available set of one or more version numbers for each one of the plurality of regions, wherein an available set for a given region comprises version numbers not included in a reserved set for the given region;

generating a first address to identify a memory location in a first region of the plurality of regions, wherein the first address comprises a first version number; and detecting an error responsive to determining the version number is in a reserved set of version numbers for the first region.

10. The method as recited in claim 9, wherein a second version number in a reserved set associated with a second region of the plurality of regions is in the available set associated with the first region.

11. The method as recited in claim 9, wherein the first region corresponds to a lower half of an address space and the second region corresponds to an upper half of an address space.

12. The method as recited in claim 9, wherein a version number in a reserved set for a particular region has all bits equal to uppermost bits of addresses corresponding to the particular region.

13. The method as recited in claim 9, further comprising indicating a memory corruption error in response to determining the first version number is not equal to a version number previously stored in association with the first address.

14. The method as recited in claim 13, wherein the version number previously stored in association with the first address is stored in a spare memory bank that corresponds to a memory bank storing data associated with the first address.

15. The method as recited in claim 9, further comprising indicating no memory corruption error in response to determining the first version number is equal to a version number previously stored in association with the first address.

16. The method as recited in claim 15, further comprising:
completing a memory access operation using the identified memory location in response to determining there is no memory corruption error; and sending an indication to a trap handler in response to determining there is a memory corruption error.

17. A processor comprising:
an instruction fetch unit configured to fetch instructions from a physical memory comprising a plurality of regions;
a decoder coupled to the instruction fetch unit;
an execution unit; and
a load-store unit;
wherein the decoder is configured to determine a received instruction is a memory access instruction corresponding to a first region of the plurality of regions;
wherein the execution unit is configure to generate a first address to identify a memory location in the first region, wherein the first address comprises a first version number; and
wherein the load-store unit is configured to:
generate a first address to identify a memory location in a first region of the plurality of regions, wherein the first address comprises a first version number; and
detect an error responsive to determining the version number is in a reserved set of version numbers for the first region.

18. The processor as recited in claim 17, wherein a second version number in a reserved set associated with a second region of the plurality of regions is in the available set associated with the first region.

19. The processor as recited in claim 17, wherein the first region corresponds to a lower half of an address space and the second region corresponds to an upper half of an address space.

20. The processor as recited in claim 17, wherein a version number in a reserved set for a particular region has all bits equal to uppermost bits of addresses corresponding to the particular region.

* * * * *